US009930997B2

(12) United States Patent
Larpenteur et al.

(10) Patent No.: US 9,930,997 B2
(45) Date of Patent: Apr. 3, 2018

(54) PORTABLE CONTAINER WITH TEMPERATURE CONTROLLABLE COMPARTMENT

(71) Applicant: Check Corporation, Troy, MI (US)

(72) Inventors: Richard D. Larpenteur, St. Clair Shores, MI (US); John M. Stephenson, Lake Orion, MI (US)

(73) Assignee: Check Corporation, Troy, MI (US)

( * ) Notice: Subject to any disclaimer, the term of this patent is extended or adjusted under 35 U.S.C. 154(b) by 0 days.

(21) Appl. No.: 14/884,323

(22) Filed: Oct. 15, 2015

(65) Prior Publication Data

US 2016/0107816 A1    Apr. 21, 2016

Related U.S. Application Data

(60) Provisional application No. 62/064,179, filed on Oct. 15, 2014, provisional application No. 62/136,926, filed on Mar. 23, 2015.

(51) Int. Cl.
| | |
|---|---|
| *A47J 41/00* | (2006.01) |
| *A47J 47/14* | (2006.01) |
| *A45C 11/20* | (2006.01) |
| *A45C 13/02* | (2006.01) |

(52) U.S. Cl.
CPC ............. *A47J 47/145* (2013.01); *A47J 47/14* (2013.01); *A45C 11/20* (2013.01); *A45C 13/02* (2013.01)

(58) Field of Classification Search
CPC ..... A47B 87/00; A47B 87/02; A47B 87/0207; A47B 87/0215; A47B 87/0246; A47B 87/0253; A47B 87/0261; A47B 57/00; A47B 57/06; A47B 57/08; A47B 57/10

USPC ....... 62/441; 312/408, 346.3, 400; D06/553, D06/555, 566, 570, 513, 514; 211/113; 220/592.01, 592.2

See application file for complete search history.

(56) References Cited

U.S. PATENT DOCUMENTS

| | | | | |
|---|---|---|---|---|
| 6,018,143 | A * | 1/2000 | Check | A47J 47/145 219/387 |
| 6,169,270 | B1 | 1/2001 | Check | |
| 6,248,981 | B1 | 6/2001 | Check | |
| 6,595,604 | B1 * | 7/2003 | Peterson | A01K 97/06 190/110 |
| 7,034,254 | B2 * | 4/2006 | Grabowski | F24C 7/10 219/387 |

(Continued)

*Primary Examiner* — Steven A. Reynolds
*Assistant Examiner* — Javier A Pagan
(74) *Attorney, Agent, or Firm* — Reising Ethington P.C.

(57) ABSTRACT

A portable container includes flexible walls defining an interior compartment and a support feature within the interior compartment providing a surface to support an item within the interior compartment, where the item is suspended above a wall. In at least some implementations, one of the walls is a lower wall and the support feature holds the item above the lower wall. In other implementations, a container includes a plurality of walls connectable together to define an interior compartment. At least two separate walls are selectively movable to and from open and closed positions. One movable wall is an upper wall and another movable wall is a wall adjacent to the upper wall. This permits, for example, items to be loaded into and unloaded from the container both through the top and through a front, rear or side wall.

13 Claims, 6 Drawing Sheets

(56) References Cited

U.S. PATENT DOCUMENTS

| | | | |
|---|---|---|---|
| 7,316,313 B1 * | 1/2008 | Juchau | B65D 81/3476 |
| | | | 190/109 |
| 7,491,912 B1 | 2/2009 | Check | |
| 2013/0119850 A1 * | 5/2013 | Breyburg | A47B 71/00 |
| | | | 312/408 |

* cited by examiner

PORTABLE CONTAINER WITH TEMPERATURE CONTROLLABLE COMPARTMENT

REFERENCE TO CO-PENDING APPLICATIONS

This application claims the benefit of U.S. Provisional Patent Application Ser. Nos. 62/064,179 filed Oct. 15, 2014, and 62/136,926 filed Mar. 23, 2015, which are incorporated herein by reference in their entireties.

TECHNICAL FIELD

This disclosure relates generally to a portable container and, more particularly, to a portable container having one or more than one temperature controllable compartment.

BACKGROUND

Food delivery containers, such as hot bags for pizza, have been used to keep food from getting cold during transportation. Hot bags have developed over time from simple insulated containers to actively heated containers. An insulated container simply minimizes heat loss. A heated container uses a heat source to add heat to a food item, instead of simply retarding heat loss. Heated containers may keep food items warmer for a longer time period so that a delivery person may have more time to deliver the food and a warmer product may be provided to the consumer. Heated containers can also be used for in-store heated storage of food items.

Hotel pans, food trays and other larger containers for food, such as may be used in the catering industry, are difficult to transport. Presently, such containers are loaded into large, heavy-duty carts having rigid walls formed from metal or rigid plastic that form a box. Among other things, the carts are heavy, take up significant space within a vehicle, and are not easy to transport, for example, in vehicles not designed for such large cargo.

SUMMARY

A portable container includes a plurality of flexible walls defining an interior compartment and a support feature within the interior compartment providing a surface upon which an item that is received within the interior compartment is supported and suspended above at least one wall. In at least some implementations, one of the walls is a lower wall (relative to direction of gravity) and the support feature holds the item above the lower wall.

In at least some implementations, a portable temperature-controlled container includes a plurality of walls, a control compartment, a temperature control source and a support feature. The plurality of walls define an interior compartment and an opening through which an item can be inserted into and removed from the interior compartment. The control compartment may be defined in at least one of said walls that define the interior compartment and have an opening. The temperature control source is adapted to be disposed within the control compartment to effect thermal energy transfer between the control compartment and the interior compartment. And the support feature is provided within the interior compartment to support an item received within the interior compartment. In at least some implementations, one of the walls is a lower wall (relative to direction of gravity) and the support feature holds the item above the lower wall. In at least some implementations, the support feature includes one or more inwardly extending flanges engageable by a portion of an item received within the container. In some embodiments, a shelf may extend across the flanges and support an item on the shelf within the container.

In at least some implementations, a container includes a plurality of walls formed from a flexible material and connectable together to define an interior compartment. At least two separate walls are selectively movable to and from open and closed positions. One of the movable walls includes an upper wall of the container and another of the movable walls includes a wall immediately adjacent to the upper wall. This arrangement permits, for example, items to be loaded into and unloaded from the container both through the top and through a front, rear or side wall, to facilitate loading items into and unloading items from the container.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Referring in more detail to the drawings, FIGS. 1-5 show a portable container 10 including a plurality of walls that define at least part of an interior compartment 20. As will be described in more detail later, one or more separators or support features 21 may be provided within the interior compartment 20 to aid in supporting and/or separating items positioned within the interior compartment. The container 10 may be used, for example, to keep food items within a desired temperature range during storage and/or delivery. The food items may be prepared at a restaurant, such as a delivery/carry-out pizza shop or a catering business, placed within interior compartment 20, and then delivered to a customer. The temperature of the stored food items can then be maintained within a desired temperature range inside interior compartment 20.

Depending on the application in which the container 10 is used, the interior compartment 20 may be maintained warmer or cooler than the ambient temperature. For instance, a pizza, hot sandwich or tray/pan of hot food or beverage item may be kept at a temperature well above ambient so it will be relatively warm or hot when delivered. Other food items, such as cold sandwiches, salads, soft drinks, or other food or beverage item may be kept below room temperature, so they remain relatively cool while delivered. Of course, it will be recognized by one skilled in the art that portable container 10 can also be used for non-food items. For example, there are many non-food items that should be stored and transported at a temperature other than room temperature. Medical items like blankets for hypothermia victims may be transported and kept above room temperature, while other medical items like certain medicines may need to be transported and kept below room temperature.

Figure 1:
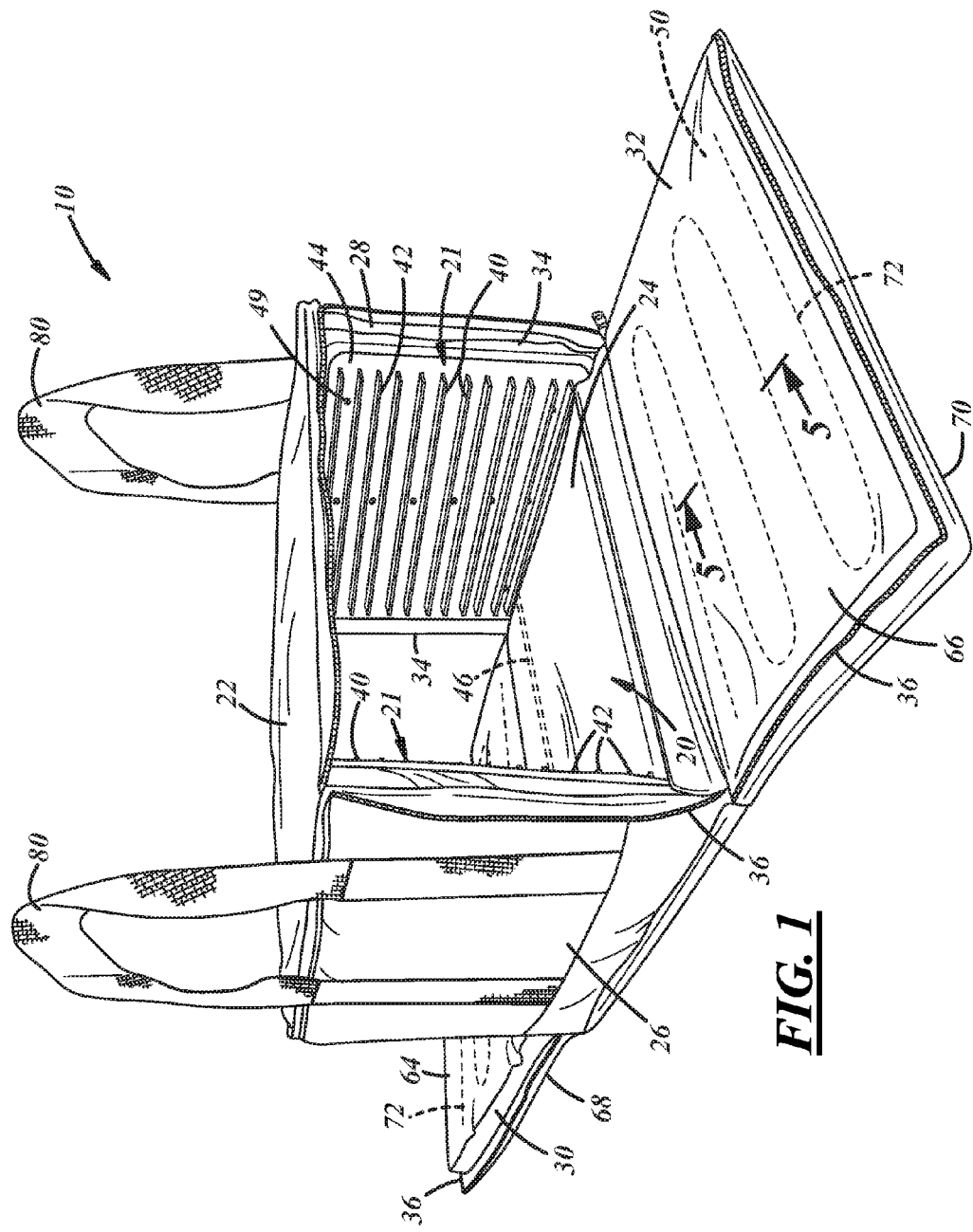
FIG. 1 is a front perspective view of a portable container showing two access panels both in their open positions.
Figure 3:
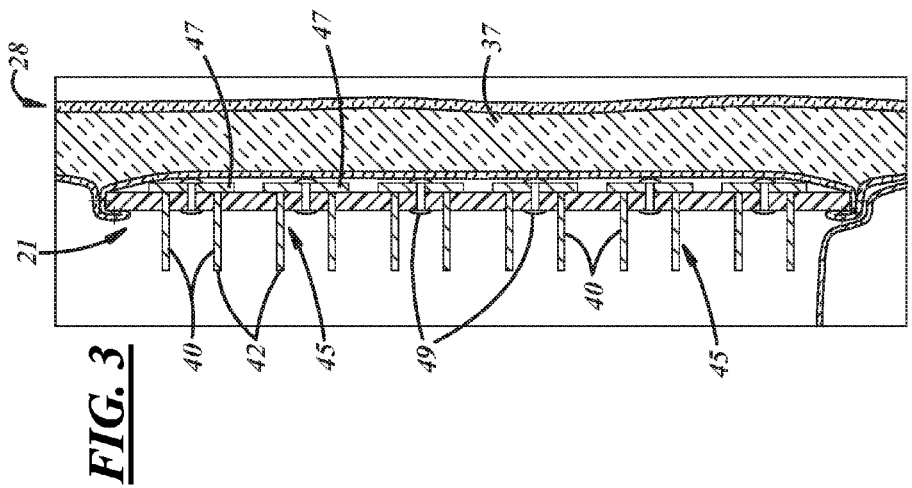
FIG. 3 is a sectional view taken generally along line 3-3 in FIG. 2.
Figure 2:
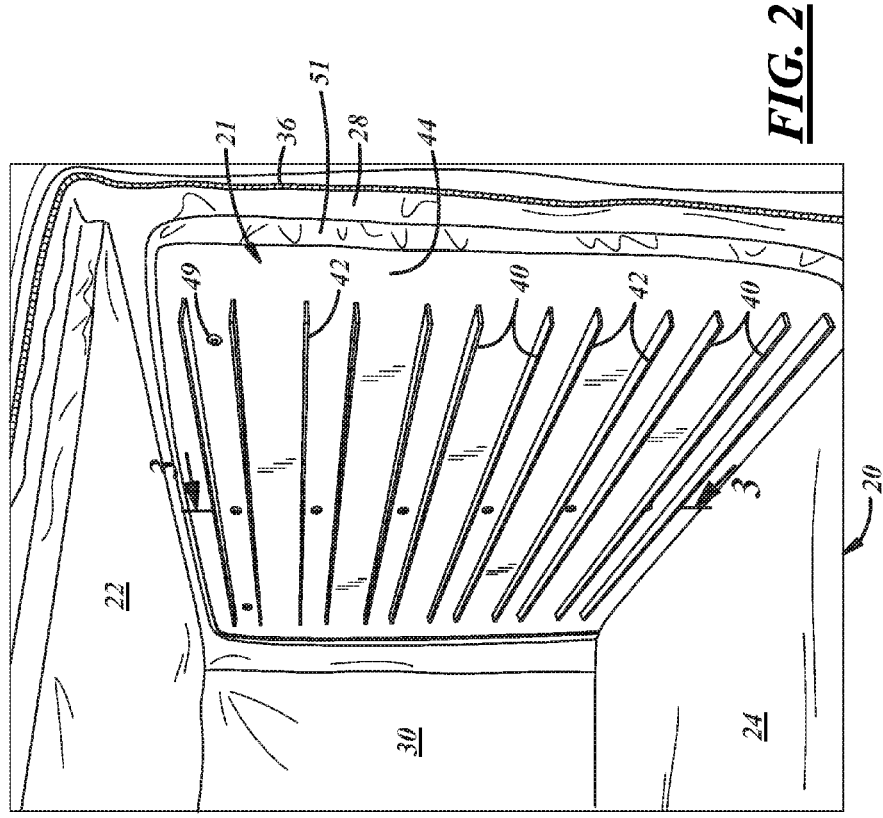
FIG. 2 is a partial front perspective view of the portable container of FIG. 1.
Figure 4:
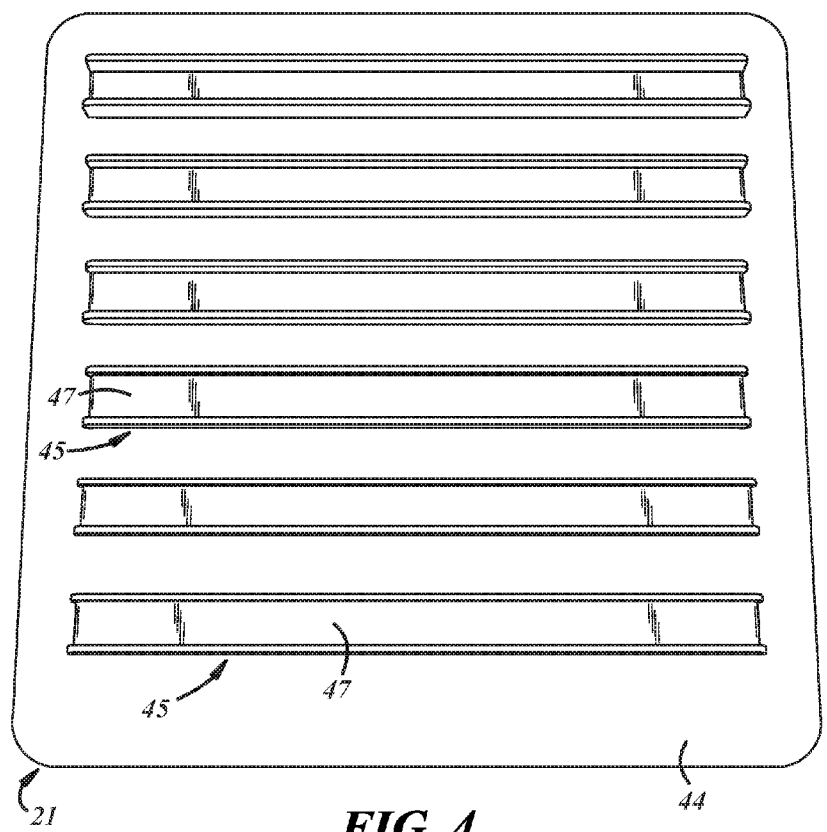
FIG. 4 shows a back side of a support feature for a portable container.

In one embodiment, interior compartment 20 includes a parallelepiped enclosure bounded by six generally rectangular walls, at least one of which is moveable, like a flap or closure, to permit access to the interior compartment. More specifically, interior compartment 20, as shown in FIG. 1, may be bounded by the interior surfaces of interconnected upper and lower walls 22, 24, side walls 26, 28, rear wall 30, and front wall 32. Interior compartment 20 may be accessed through one or more openings 34 that may be provided by moving any of the walls, or any portion of one or more walls. In one implementation, side walls 26, 28 are permanently coupled to the upper and lower walls 22, 24, and the front wall 32 and/or rear wall 30 is/are movable relative to the other walls. In this way, items can be placed into or removed from the container 10 through openings at the front or rear of the container, as desired.

The size and shape of interior compartment 20 may vary, and may correspond to the particular application. For example, interior compartment 20 can be sized to hold one or more standard size hotel pans or catering trays. If the intended use is for differently sized or different quantities of food items, then interior compartment 20 can be sized accordingly. Interior compartment 20 may take other forms besides a parallelepiped, such as a spheroid, ellipsoid, or other form. The form may be chosen based on the particular application, such as to conform to the shape of the stored item.

Interior compartment 20 may be constructed in a number of ways. For example, upper, lower, side, rear and front walls 22-32 may be individual pieces of material that form interior compartment 20 by connecting certain of the walls together (e.g. by stitching) along adjacent edges. Multiple walls may also be formed from one piece of material, bending or folding the material to form two or more walls. For example, the walls 22-32 may be formed by folding one generally "t" shaped piece of flexible material and connecting it to itself as desired. As shown, the upper, lower and side walls 22, 24, 26 and 28 are connected together, and the front and rear walls 30, 32 may be releasably coupled to the other walls by zippers 36. In this form, one or both of the front and rear walls may be moved to open positions, as shown in FIG. 1, or closed positions as shown for the rear wall 30 in FIG. 2. The front and rear walls 30, 32, in at least some implementations, are releasably coupled along adjacent edges to the other walls, such as by velcro, snaps, buttons or one or more zippers, by way of non-limiting examples. In the example shown in the drawings, zippers 36 are used. One skilled in the art will recognize that many other configurations are also possible.

Figure 5:
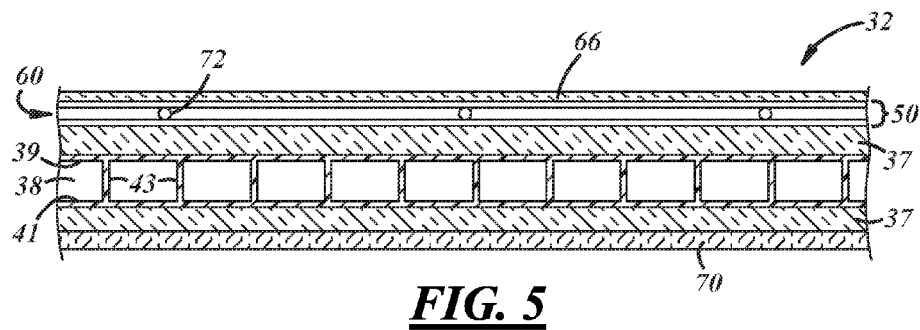
FIG. 5 is a sectional view taken generally along line 5-5 of FIG. 1.

Walls 22-32 may be made of a flexible and durable material, such as nylon. Nylon is also suitable for efficiently facilitating thermal energy transfer relative to the interior compartment 20. Furthermore, nylon is also useful for allowing moisture to permeate through interior compartment 20. This may be desirable when transporting certain items, such as a hot pizza, to limit or prevent condensation in interior compartment 20. Walls 22-32 may also include insulation 37 (FIGS. 3 and 5) to minimize undesirable thermal energy transfer between interior compartment 20 and the environment. Such insulation may be used within those walls that have exterior surfaces that are exposed to the environment. One suitable insulation material is called Thermoloft and is manufactured by Dupont. As shown in FIG. 5, a stiffening or reinforcement member 38 may be included within any number of the walls 22-32. The reinforcement member 38 may be rigid and serve to prevent undue collapse of the walls 22-32 when items are placed within the container 10. In one implementation, the reinforcement members 38 are formed from an extruded polymeric sheet having opposed walls 39, 41 and intermediate ribs 43 extending between the walls. Of course, any material may be used for the reinforcement members and they may be provided in any shape or form and are not limited to a plate.

Generally, the interior surfaces of walls 22-32 that form interior compartment 20 may be, if desired, smooth and devoid of any obstructions, pockets, or other internal features. If desired, electrical cords and the like may be secured in place and hidden from view by enclosures, flaps or the like. And such flaps may be secured with hook and loop or other closure. This construction may serve multiple functions. For example, portable container 10 may be used for food delivery, which typically means that food items may be inserted into and removed from interior compartment 20 many times. A smooth interior construction may ensure that food items and portable container 10 are not damaged during use, specifically while food items are moving through an opening 34. Also, a smooth interior construction may facilitate cleaning the interior compartment 20, since food item remnants are not trapped in internal pockets or crevices and can be easily removed. Connecting walls 22-32 in a continuous fashion may also facilitate cleaning interior compartment 20. Furthermore, the walls may be continuously connected so that storage compartment 20 is a complete enclosure, leaving only one or more openings 34 for food items to pass through.

As noted above, one or more separators or support features 21 may be provided within the interior compartment 20, to facilitate securing and/or separating items positioned within the interior compartment. In the implementation shown, the support features 21 include inwardly extending rails or flanges 40. The flanges 40 may extend lengthwise, generally perpendicularly to an opening 34 through which items are placed into the interior compartment 20, and the flanges 40 may have a width oriented inwardly, from a wall toward a center of the interior compartment 20. In at least some implementations, the flanges 40 are provided in pairs with one on each of two opposed walls (e.g. side walls 26, 28) and the flanges are aligned at the same level or height within the container 10, generally parallel to the lower wall 24 of the container 10. In an example where the front and/or rear walls 30, 32 are movable and define the opening(s) 34 of the container 10, the flanges 40 may extend lengthwise along the side walls 26, 28 with the width of the flanges 40 extending inwardly. The flanges 40 may be implemented as cantilevered bodies having free ends 42 within the interior compartment 20, spaced from the side walls 26, 28. In this way, the flanges 40 may define partial shelves upon which portions of an item (e.g. a bottom of a pizza box or an outwardly extending lip/rim of a hotel pan) may be rested. Multiple flanges 40 may be provided at different heights within the container enabling multiple items to be received within the container 10, with each item separated from (i.e.

not resting on or engaging) the other items, if desired. Of course, contact among the items may be permitted, as desired.

In applications where items in the container 10 may have greater weight, such as with hotel pans, the flanges 40 may be carried by reinforcement members 44. The reinforcement members 44 may be removably received within the interior compartment 20, or they may be fixed to the container 10. In one form, the reinforcement members include plates 44 received within the interior compartment 20 each with an outer surface generally parallel and immediately adjacent to the interior surface of the side walls 26, 28. The plates 44 may be received within a pocket, slot, or other structure within the container to hold the plates in a desired position and orientation. The pocket may provide material 51 (FIG. 2) overlapping at least some of the periphery of the plate 44. The plate 44 may also be simply overlapped by portions of adjacent walls, such as the upper and lower walls 22, 24. In this way, edges of the plates may be received in creases or folds between adjacent walls (e.g. between upper wall 22 and side wall 26 or 28, and between lower wall 24 and side wall 26 or 28, as shown in FIG. 1).

The plates 44 may be formed of any suitable material (e.g. wood, plastic, metal, composite). The flanges 40 may be formed from the same material as the plates 44, such as by molding the plates and flanges from a polymeric material, or by bending a metal plate to provide the flanges. And/or the flanges 40 may be formed separately from the plates 44 and secured thereto in any suitable way, including but not limited to, rivets, bolts, adhesive, or by overlapping a portion of the flange with a portion of the plates, or vice versa. For example, openings may be provided in one or both of the plate or flange body, and tabs on the other body may be received into the openings to support and retain the flange 40 body on the plates 44. The flanges 40 maybe removably or permanently coupled to the plates 44, as desired. In the implementation shown, two or more flanges are connected together or defined by a body 45 that is carried by the plates 44. The body may include a back 47 on the opposite side of the plates 44 as the flanges 40, with rivets 49 connecting the bodies 45 to the plates 44.

Braces 46 (one example of which is shown in dashed lines in FIG. 1) or other supports may be provided extending between the plates 44, to maintain a desired separation of the plates and/or to provide additional structural support for the container 10. The braces may be separate from the plates, or they may be attached thereto, and they may be adjacent to the upper and lower walls 20, 22, by way of examples without limitations.

In at least some implementations, control compartments 50 lie adjacent to interior compartment 20. The front and rear walls 30, 32 may be formed from multiple layers with control compartments 50 (labeled in FIG. 5) defined between the layers of these walls. As shown, each control compartment may be positioned adjacent to interior compartment 20. To keep stored items within a desired temperature range, thermal energy may be transferred between interior compartment 20 and control compartments 50.

Control compartments 50 facilitate such desirable thermal energy transfer by housing temperature control sources 60. Generally, a temperature control source either adds heat to or removes heat from interior compartment 20. When transporting a hot item such as a pizza or warm item in a hotel pan, the temperature control source may be a heat source, such as an electric heating element 72 (shown generally in dashed lines in FIG. 1). And when transporting cold items like salads and soft drinks, the temperature control source may be a heat absorber, like an ice pack or refrigeration coils. So temperature control sources 60 may be housed within the control compartments 50, respectively, to facilitate desirable thermal energy transfer. Of course, control compartments and temperature control sources may also or instead be associated with any of the other walls, and may be provided in any one or more than one walls, up to and including all of the walls.

A control compartment facilitates such thermal energy transfer by, for example, providing a path of least resistance for such energy transfer. In one embodiment, control compartments 50 each have a thin boundary that separates them from interior compartment 20, and an insulated boundary that separates them from the environment. The thin boundary allows thermal energy to transfer efficiently between the compartments, while the insulated boundary prevents or limits thermal energy to transfer with the environment. While interior compartment 20 and control compartments 50 may share a boundary, in at least some implementations, they are completely separate enclosures that are adjacent to but isolated from one another. In such an embodiment, interior surfaces 64, 66 of walls 30, 32 may be thin boundaries that facilitate efficient thermal energy transfer, and exterior surfaces 68, 70 of walls 30, 32 may be more insulated boundaries that prevent or limit undesirable thermal energy transfer with the environment.

In one embodiment, interior surfaces 64, 66 of the walls 30, 32 may be thin flexible material like nylon. Such thin material allows the compartments to remain isolated while facilitating efficient thermal energy transfer. Exterior surfaces 68, 70 are in contact with the environment and may include insulation to minimize undesirable thermal energy transfer. Insulation may also be used within side walls 26, 28 to further limit undesirable thermal energy transfer between interior compartment 20 and the environment. Exterior fabric surfaces may be formed with a higher, heavier and/or thicker denier nylon (for example, without limitation, 1000 denier) which may reduce and/or inhibit heat transfer to the exterior or ambient. Interior fabric surfaces may be formed of lower, thinner and/or smaller denier nylon (for example, without limitation, 600 denier) to more readily permit heat transfer between the storage and control compartments. The density of the weave of the interior and exterior surfaces may be about the same, although different weave densities may be used if desired.

In at least some embodiments, such as is shown in FIG. 1, control compartments 50 may have length and width dimensions closely matching those of interior compartment 20. In such an embodiment, control compartments 50 may be coextensive with front and rear walls 30, 32. And control compartments 50 may be configured such that their respective edges are generally aligned with those of interior compartment 20. Portable container 10 may then appear more uniform and facilitate a more even distribution of thermal energy transfer between control compartments 50 and interior compartment 20.

Control compartments 50 may be sized to accommodate desired temperature control sources 60. For example, electric heating elements may be substantially smaller in overall height than ice packs or refrigeration coils. The height of control compartments 50 may be substantially small, even less than ¼ of an inch, to accommodate thin temperature control sources, such as thin electric heating elements. But the height of control compartments 50 can be large enough to accommodate various other types of temperature control sources or even multiple temperature control sources inside of one control compartment. Control compartments 50 may be substantially complete enclosures with an opening for insertion and removal of the temperature control sources 60.

Temperature control sources 60 may be removable, modular, electric heating elements. Heat is produced by supplying an electric current through a conductor, which has suitable resistance to provide the desired amount of heat when such an electric current is applied. Conductor is generally in the form of a resistance wire 72. Temperature control sources 60 may be controlled by a thermostat. This may facilitate maintaining the interior compartment 20 within a pre-determined or desired temperature range.

Control compartments 50 may utilize various internal separators for housing multiple temperature control sources within a single control compartment. This may be desirable when the temperature control source is comprised of small individual units, such as ice packs, where each ice pack may be placed so that the internal separators limit the ice packs' movement within the control compartment. Other separators may also be useful for housing temperature control sources of various types, but maintaining proper separation.

In at least some implementations, the container 10 may be configured to permit transport of one or more hotel pans. In this example, the pairs of flanges 40 are provided in number corresponding to the maximum number of hotel pans desired to be received at one time into the container. The flanges 40 are spaced apart a distance equal to or greater than the depth of the hotel pans so that the pans either engage each other or so that the pans are separated and do not engage each other, as desired. Further, the pans may include lids or other covers, and corresponding spacing of the flanges 40 may be provided. The flanges 40 may be arranged to engage and support a bottom of the hotel pans, or to hang/suspend the hotel pans in the container, by an outwardly extending rim or lip of the hotel pan received over and on the flanges. After closing up the opening(s) 34 through which the hotel pans were placed into the container 10, the container may be moved, such as by carrying the container via handles 80 on the container 10, or by placing the container on a cart or the like. The handles may be flexible strips of fabric or other material and may be releasably or permanently connected to walls of the container, such as by stitching. As shown, the handles are connected to the side walls 26, 28, and have loops that extend across the upper wall 22, although the handles could be otherwise arranged.

The flexible walls that define the container 10 may be light weight to facilitate transporting the container with or without items within the interior compartment. Further, the flexible walls permit the container 10 to be flattened when items are not present within the interior compartment to reduce the size of the container and facilitate its shipping or transport. The flexible walls may conveniently be formed from various materials, including fabric formed from natural and/or synthetic fibers, with or without a foam or other flexible substrate included, such as between two sheets of outer material. The flexible walls can provide good insulation or other temperature control properties to advantageously permit temperature control within the interior compartment. Further, any plates 44 (like those for the support features 21), reinforcing or stiffening members 38 may be removably received within the container 10, such as within the walls 22-32 of the container to facilitate cleaning of the container, changing out components (e.g. heavier duty components for heavier applications, lighter duty components for lighter applications, etc), and folding or flattening the container 10. The temperature control sources may also be removably carried by the container. To facilitate removal of such components, the walls may include openings that may be selectively opened and closed, such as by hook and loop fasteners, buttons, snaps, zippers or the like.

Figure 6:
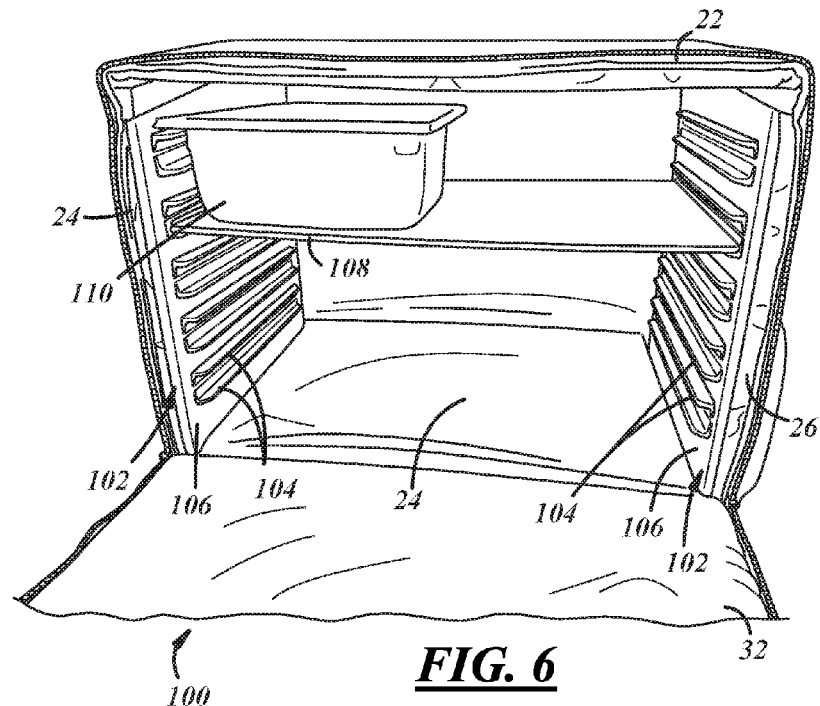
FIG. 6 is a front perspective view of a portable container like that shown in FIG. 1 and including spaced apart support features.

FIG. 6 illustrates a portable container 100 that may be constructed and arranged like the container 10, or otherwise, as desired. In this regard, the walls are labeled with similar or the same reference numbers for convenience, the walls could but need not be constructed and arranged in the same manner as previously described. The container 100 includes support features 102 having flanges 104 integrally formed with reinforcement members or plates 106. The support features 102 may be formed from one piece of material such that the plates 106 and flanges 104 are integrally provided as different features formed in a single piece of material. This may be done, for example, by molding the component from plastic. In one implementation, a vacuum formed support feature 102 formed from ABS has been found to provide the structural rigidity necessary to support items on the flanges while being lightweight and providing a relatively smooth sliding surface on the flanges to facilitate loading items having a rim engaged with the flanges 104 (e.g. hotel pans, which typically have metal rims). In at least some implementations, the coefficient of friction provided by the flanges 104 is less than with aluminum flanges (e.g. unpolished aluminum stock), or at least the frictional force between the flanges and a metal rim or component surface is less than with a metal flange. While ABS has been noted, other polymeric and/or composite materials may be used. As noted earlier in this document, a one piece metal support feature may also be provided. Among other things, forming the support features from a single piece of material can also reduce labor and time required to make/assembly the support features compared to multi-component support features.

In the example of FIG. 6, a shelf 108 extends between two spaced apart support features 102. The shelf 108 overlaps and is supported on a flange 104 extending from each support feature 102, the shelf is generally parallel to the flanges and generally perpendicular to the support feature plates 106. The shelf 108 may be used to support an item 110 that is not wide enough to itself engage a flange on both of the support features 102. In the example shown, a half hotel pan 110 is supported on the shelf 108. Also in the example shown, the shelf 108 and container 100 are wide enough to receive and support two half hotel pans, side-by-side. The shelf 108 could also be used with a full-size hotel pan, but the container 100 (in at least this implementation) may be designed to support a full-size hotel pan on opposed flanges 104 and without need of an underlying shelf 108. Further, the shelf 108 or a bracket extending between the opposed support features 102 may be used to suspend or hang items within the container 100. In the example shown, the shelf 108 extends substantially completely from front-to-back in the container 100 and from side-to-side between the support features 102. This may provide a divider of sorts within the container 100. Of course, the shelf 108 could be smaller and/or could include openings or voids which may more readily facilitate circulation and heat distribution/temperature equalization within the container, as desired. Also, while the shelf 108 in FIG. 6 is shown as being generally planar and solid, it need not be and it could carry or include a temperature control member or source such as a heating or cooling element, if desired.

FIGS. 7-10 illustrate a portable container 120 having one or more generally flat or planar walls, such as upper and lower walls 122, 124, front and back walls 126, 128 and side walls 130, 132. In the implementation shown, the walls 122-132 are generally rectilinear (where generally means that the walls are more rectilinear than not, taking into account the fact that the wall are made out of one or more layers of pliant material) and define a rectangular cuboid having an interior compartment 134. As noted with regard to the previously described embodiments, the size and shape of interior compartment 134 may vary, and may correspond to the particular application. For example, interior compartment 134 can be sized to hold one or more standard size hotel pans or catering trays, pizza boxes, bags of food, carryout food containers, dishes, beverage containers, blankets, medical components or substances, or anything else desired. If the intended use is for differently sized or different quantities of food items, then interior compartment 134 can be sized accordingly. Interior compartment 134 may take other forms besides a parallelepiped, such as a spheroid, ellipsoid, or other form. The form may be chosen based on the particular application, such as to conform to the shape of the stored item.

Figure 7:
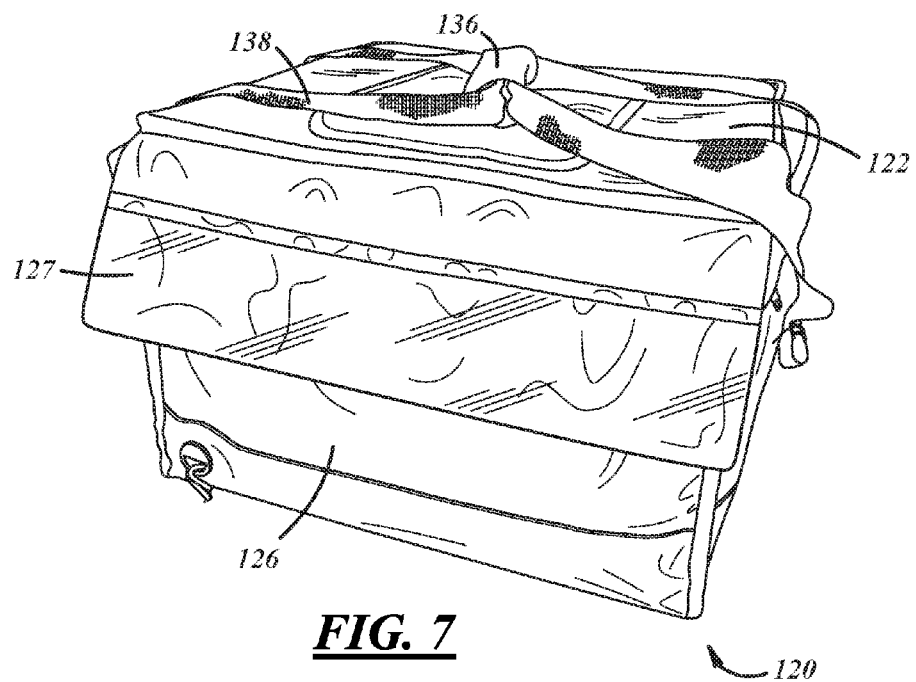
FIG. 7 is a front perspective view of a portable container.
Figure 8:
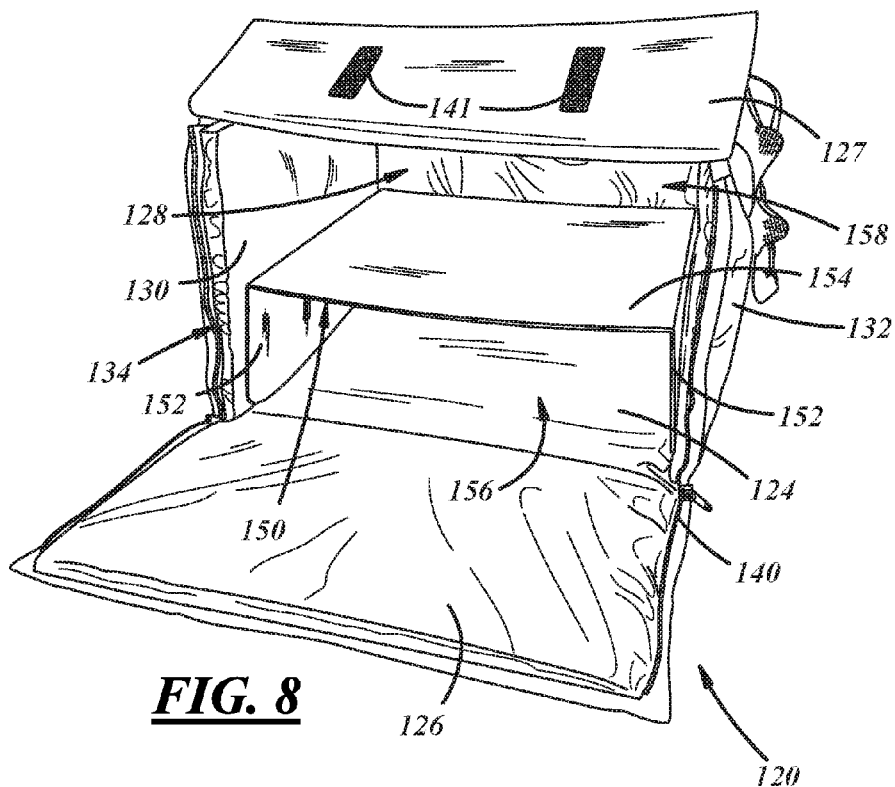
FIG. 8 is a front perspective view of the container of FIG. 7 showing a front access panel or wall in an open position.

The walls 122-132 are connected together to define an integral structure that may be lifted and carried around, such as by the handle 136 and straps 138 (FIG. 7). One or more of the walls 122-132 may be releasably coupled to other walls, and movable between an open position permitting access to the interior compartment and a closed position defining a substantially complete enclosure (in at least some implementations) as shown in FIG. 7. In the implementation shown, as shown in FIG. 8, the front wall 126 (and its flap 127) is releasably coupled to the side walls 130,132 and/or upper wall 122 by one or more zippers or other releasable and non-destructive connector(s) 140, such as velcro, snaps, buttons or the like. The front wall 126 may be moved from a closed position (shown in FIG. 7) to an open position (shown in FIG. 8). This enables items to be loaded into and removed from the container 120 generally horizontally, or laterally. While shown as having a front wall 126 that opens, in other versions any or all of the back, side and front walls may open to permit access to the interior compartment 134.

Figure 9:
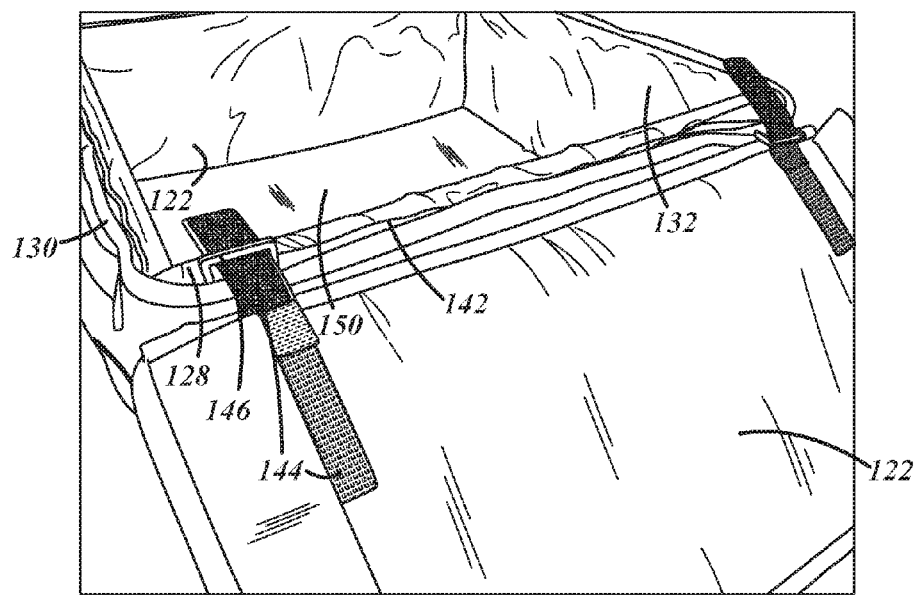
FIG. 9 is an enlarged fragmentary perspective view of a portion of the container showing releasable attachment features for an upper wall of the container.

FIG. 9 shows an implementation where the upper wall 122 is also movable from a closed position to an open position. In this example, the upper wall 122 is connectable to one or more of the side walls and/or the front wall and/or the back wall by one or more releasable connectors 141 (e.g under lid 127, or otherwise, such as around the periphery of the upper wall 122) so that the upper wall 122 can be selectively opened to permit access to the interior compartment 134 from above the container. This permits loading from the top of the container 120, and this might be easier for loading certain products into the container than side loading (where "side" loading includes loading through an open front or back wall). This may be readily accomplished in a container wherein the upper wall does not bear weight (e.g. handles are attached to the sides and/or bottom and/or back walls, and hence, a firm/strong connection between the top wall and adjacent walls is not needed.

If desired, the upper wall 122 may be completely removable from the remainder of the container 120. In the example of FIG. 9, the upper wall 122 is not permanently connected (e.g. by stitches or other connection that must be destroyed in order to break it) to the remainder of the container and is instead connected by a non-destructive connector 142 like velcro, zipper, buttons or snaps so that the upper wall 122 can be removed and replaced as desired. This may permit the upper wall 122 to be cleaned, repaired or swapped out for a different upper wall, as desired. In the example shown, the upper wall 122 is coupled to the remainder of the container 120 by a first connector 142 (already noted above) and a second connector 144. The first connector 142 provides a primary connection between the upper wall 122 and an adjacent wall (side/front/back wall). The second connector 144 may provide security to inhibit unintentional removal of the upper wall 122 by connecting the upper wall to a fixed connector 146 that is attached to a different portion of the container (shown as the adjacent back wall 128). In this example, the fixed connector 146 includes one or more buckles 146 or loops fixed to the back wall 128 of the container 120 and the second connector 144 includes a loop of material that is coupled to the buckle 146, such as a strip of material looped through an opening of the buckle. The second connector 144 may be tied to the buckle 146, or it may include velcro or other releasable fastener securable to the upper wall 122 and the buckle 146 to permit the second connector to be fastened and unfastened from the buckle, as desired. The second connector 144 may be removable or releasable by force applied in a direction different than the direction needed to remove or release the first connector 142. This provides further protection against unintentional removal of the upper wall 122 as a force applied in one direction is not likely to release both the first connector 142 and the second connector 144. As in other embodiments, one or more walls 122-132 may define or include a temperature control chamber or source to facilitate control of the temperature within the interior compartment. Hence, the upper wall is movable to and from open and closed positions and a wall that is immediately adjacent to (and may be engaged with) the upper wall also is movable to and from open and closed positions. The wall immediately adjacent to the upper wall that is movable to and from open and closed positions may be perpendicular to the upper wall, and may engage the upper wall along or adjacent to an upper edge of that wall. In this way, contiguous or adjacent walls of the container may be opened to provide access to the interior compartment and facilitate loading and unloading of the container.

Figure 10:
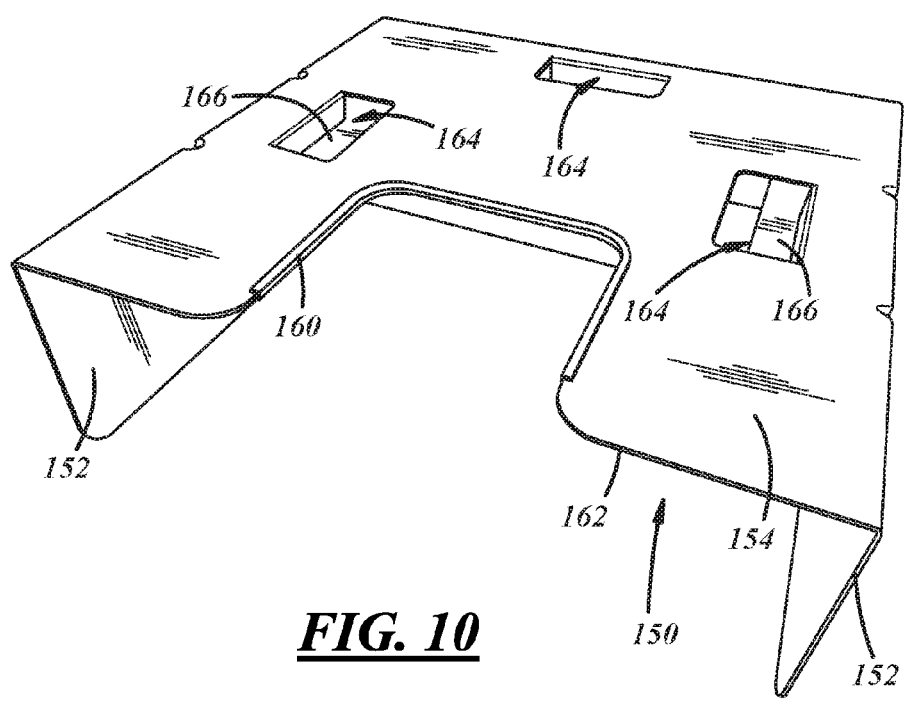
FIG. 10 is a perspective view of a tray that may be used in the container, such as is shown in FIG. 8.

FIGS. 8 and 10 illustrate a removable support 150 that may be received within the interior compartment 134 of a container 120. In the example shown, the support 150 is freestanding and self-supporting when inserted into the container, and includes at least two spaced apart uprights 152 and a support surface or shelf 154 spanning between and interconnecting the uprights. The uprights 152 may be positioned adjacent to opposed side walls 130, 132 of the container 120 and the shelf 154 may be located between the upper and lower walls 122, 124 of the container 120. The support 154 may be formed from one piece of material, or many. In the implementation shown, the support 154 is formed from one piece of metal bent into a U or channel shape with squared corners. The shelf 154 may include at least a portion that is generally planar and extends from and between the uprights 152. This may provide an open area 156 in the interior compartment 134 below the shelf 158 and between the uprights 152, as well as another open area 158 above the shelf 154 for storage of different items below and on the support 150. The shelf 154 may be removable from the container 120 to facilitate cleaning the shelf and interior compartment 134, as well as to permit use of the container without the shelf. In a container 120 having both upper and front walls 122, 126 that may be opened, items may be loaded onto the shelf 154 from both the open front or upper walls, and items may conveniently be loaded into the open area 156 under the shelf 154 through the open front wall 126.

The support 150 may include other features that facilitate loading items into and unloading items from the container 120, as desired. In one implementation shown, a cut out or void 160 (FIG. 10) in the shelf 154 extends to a front edge 162 to facilitate manually accessing items stored in the area 156 beneath the shelf. One or more flanges 164 may extend from the uprights 152 and/or the shelf 154, and may themselves define a secondary support surface. In the example shown in FIG. 10, three flanges 164 are punched from the shelf 154 to form depending hooks each having a surface 166 spaced from and generally parallel to the shelf 154. An item may be placed on the hook surfaces 166 and supported relative to the shelf 154. For example, a temperature control source or element (e.g. a heating element) may be received below the shelf and suspended on the hooks so that the heating element is spaced from the bottom wall 124 of the container. Items may be placed both on top of the shelf 154 as well as between the heating element and the bottom wall 124 of the container 120, with all such items being in relatively close proximity to the heating element. The cutout 160 may also facilitate access to the heating element, which may have a smaller surface area than the shelf 154.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A portable temperature-controlled container, comprising:
    a plurality of walls that define an interior compartment and an opening through which an item can be inserted into and removed from the interior compartment, wherein one of said walls is movable to selectively close the opening;
    a control compartment defined in at least two of said walls that define the interior compartment and having an opening, and at least one of said walls with a control compartment includes the wall that is movable to selectively close the opening;
    a temperature control source disposed within each control compartment that effects thermal energy transfer between the control compartment and the interior compartment; and
    a support feature within the interior compartment to support an item received within the interior compartment, wherein the support feature is adjacent to one of said plurality of walls and said temperature control source is located within one of said plurality of walls that is not the wall that the support feature is adjacent to.

2. The portable temperature-controlled container of claim 1 wherein the walls are defined by a flexible fabric material, and the wall in which the control compartment is defined includes an interior surface between the control compartment and the interior compartment and an exterior surface outboard of the control compartment and the interior compartment and wherein the exterior surface is formed from thicker material than is the interior surface.

3. The container of claim 2 wherein the exterior surface is more insulative against heat transfer therethrough than is the interior surface.

4. The portable temperature-controlled container of claim 1 wherein the support feature includes flanges extending inwardly from opposed walls of the container.

5. The portable temperature-controlled container of claim 4 wherein the flanges are carried by plates within the interior compartment.

6. The portable temperature-controlled container of claim 5 wherein the flanges and plates are formed from the same piece of material.

7. The portable temperature-controlled container of claim 6 wherein the flanges and plates are molded from a plastic material.

8. The container of claim 5 which also includes pockets that overlap at least some of the periphery of the plates.

9. The container of claim 1 wherein the said at least one of said plurality of walls in which the control compartment is defined includes an interior surface between the control compartment and the interior compartment and an exterior surface between the control compartment and the environment, and the interior surface permits heat transfer therethrough more readily than does the exterior surface.

10. The container of claim 9 wherein the interior surface is formed from a flexible material.

11. The container of claim 10 wherein the control compartment and interior compartment are adjacent to each other but completely separate from each other.

12. The portable temperature-controlled container of claim 1 wherein two openings are provided and two walls are movable and each movable wall selectively closes a separate one of the openings, and wherein each movable wall includes a control compartment with a temperature control source.

13. The portable temperature-controlled container of claim 12 wherein the two movable walls are on opposite sides of the interior compartment.

* * * * *